United States Patent [19]

Sommargren

[11] Patent Number: 4,963,022
[45] Date of Patent: Oct. 16, 1990

[54] METHOD AND APPARATUS FOR GENERATING A STRAIGHT REFERENCE LINE

[75] Inventor: Gary E. Sommargren, Santa Cruz, Calif.

[73] Assignee: Zygo Corporation, Middlefield, Conn.

[21] Appl. No.: 261,575

[22] Filed: Oct. 24, 1988

[51] Int. Cl.$^5$ ............................................. G01C 15/00
[52] U.S. Cl. .................................................. 356/247
[58] Field of Search .................... 356/247, 248; 33/286, 33/290, 291, 293

[56] References Cited

U.S. PATENT DOCUMENTS 3,588,255 6/1971 Alexander ............................ 356/247

OTHER PUBLICATIONS

Progress in Optics I, Wolf, 1961, pp. 308–311.
The Principles of Optics, Hardy and Perrin, 1932, pp. 127–130.
Introduction to Optics Geometrical and Physical, Roseatson, 1959, pp. 187–196.

*Primary Examiner*—Vincent P. McGraw
*Assistant Examiner*—S. A. Turner
*Attorney, Agent, or Firm*—Bryan, Cave, McPheeters & McRoberts

[57] ABSTRACT

A system for generating a spatially stable, small diameter light beam (18) which serves as a straight reference line over long distances may use the direction of propagation of light and one fixed point (11, 12) or may be between two fixed points (12, 21). In either instance, a light source (1) emits a beam (2) which is expanded, collimated and spatially filtered (3, 4). In the first instance, the collimated light wave (11) produced is diffracted by a sphere (12) to produce the small diameter light beam (18) which is constituted by a continuum of spots (16) which, in turn, produces a Poisson's spot (16) on a detector (21) which spatially samples the intensity of the spot (16). The resultant voltage (22) from each active detection are sent to a center locating electronics/computer (24) which processes the voltages (22) to give the position of the detector (21) relative to the straight reference line (18). In the second instance, the collimated light wave (11) is produced by reflecting the beam (5) passing through the pinhole (4) from a steering mirror (6) which can be tilted about two axes by applying error signal voltages (27, 28) to tilt adjusters (7, 8) which are related to the displacement of spot (16) from the center of detector (21) in the X and Y directions. The tilting of the mirror (6) changes the angle of incidence of the light wave (11) on the sphere (12) so that the spot (16) is centered on the detector (21).

42 Claims, 4 Drawing Sheets

METHOD AND APPARATUS FOR GENERATING A STRAIGHT REFERENCE LINE

BACKGROUND OF THE INVENTION

1. Field of the Invention:

The present invention relates to a method and apparatus for generating a spatially stable, small diameter light beam over a long distance. This small diamter light beam defines a straight reference line which is useful for alignment and measurement purposes.

2. Prior Art

In many instances there arises the need to produce a straight reference line against which objects are aligned or straightness of motion is measured. A common tool is the "straight edge" comprised of a rigid material fabricated with one flat side. There is, however, a practical limit on how long such a "straight edge" can be, which is about one meter because of warping due to thermal gradients and gravity sag.

An alignment telescope can also serve as a reference line. These can be used over long distances but they require mechanical refocusing for different distances which may change the direction of the straight reference line. The stability of the reference line also depends on how well the alignment telescope is mounted.

A laser beam can also be used to generate a straight reference line. However, because of the inherent divergence of a laser beam, the diameter of the reference line cannot be kept sufficiently small over long distances. It is desirable to have a small diameter since the tolerance to which its center can be found is proportional to its diameter. Therefore, for high precision metrology, a small diameter is preferred.

The present invention provides a small diameter light beam over long distances by using the unique beam produced when an incident wave is diffracted by a sphere. In one embodiment of the instant invention, the straight reference line is defined by the direction of propagation of a light wave and the center of the diffracting sphere. In another embodiment of the instant invention, the light beam is spatially stabilized by fixing it at two points, since two points define a straight line. One point is the center of the diffracting sphere and the other point is the center of a detector, e.g. a four quadrant segmented photodetector. By properly processing the output of of the detector, the incident wave can be steered to keep the beam centered on the detector.

SUMMARY OF THE INVENTION

In accordance with the instant invention, I provide a system capable of generating a spatially stable, small diameter light beam which serves as a straight reference line, comprising (1) a source of spatially filtered, collimated light wave, most preferably a laser; (2) means, most preferably a sphere or circular disk whose diameter is smaller than the diameter of said collimated light wave and whose center defines one fixed point, for diffracting said collimated light wave to form a small diameter light beam; and (3) means, most preferably a detector for indicating the position of the center of said small diameter light beam relative to the center of said detector. In another embodiment of the instant invention, (4) means, most preferably a steering mirror, to control the direction of propagation of said collimated light wave, and (5) means for producing signals to drive said steering mirror so that the center of said small diameter beam of light is superposed on the center of said detector, thusly generating a spatially stable, small diameter light beam between said two fixed points that serves as a reference straight line for alignment and measurement purposes.

THE DRAWINGS

DETAILED DESCRIPTION OF THE INVENTION

Figure 1:
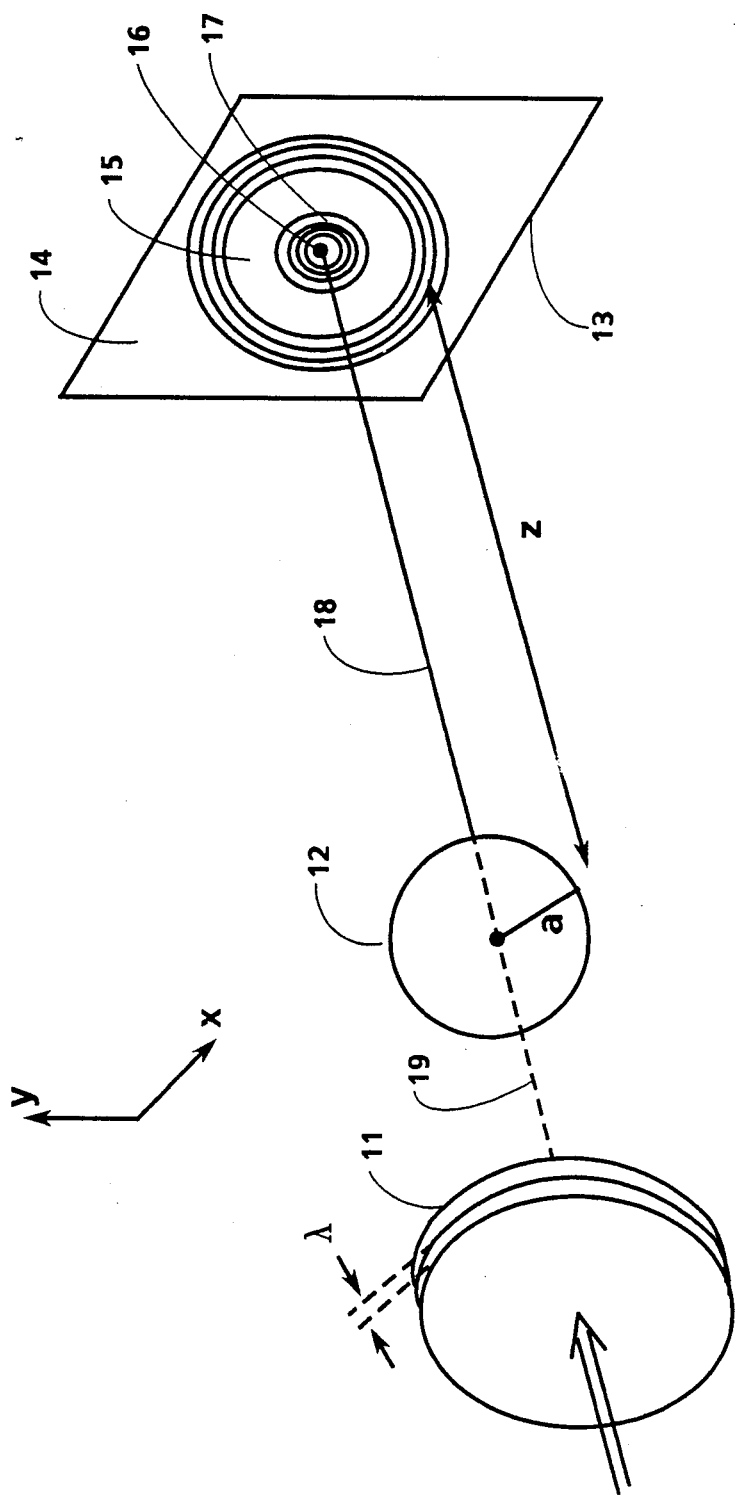
FIG. 1 depicts in schematic form the general diffraction of a wave by a sphere showing the generation of a small diameter light beam.

FIG. 1 depicts in shcematic form the general diffraction of a light wave by a sphere. Wave (11) of wavelength, $\lambda$, propagates to the right and is incident on sphere (12) of radius, a. Due to the interaction of wave (11) and sphere (12) the uniform intensity of wave (11) is altered. This phenomenon is known as diffraction. The intensity of the diffracted wave can be observed on observation screen (13) placed at any distance, z, behind sphere (12). The intensity pattern on screen (13) has two distinct regions: bright region (14) and shadow region (15). Shadow region (15) has small high intensity spot (16) located in the center, commonly known as Possion's spot, surrounded by lower intensity diffraction rings (17). Since spot (16) exists for all positions, z, of observation screen (13), the continuum of spots (16) constitutes small diameter light beam (18). Beam (18) is a straight line and its extension, dotted line (19), passes through the center of sphere (12) and is perpendicular to the surfaces of incident wave (11).

Figure 2:
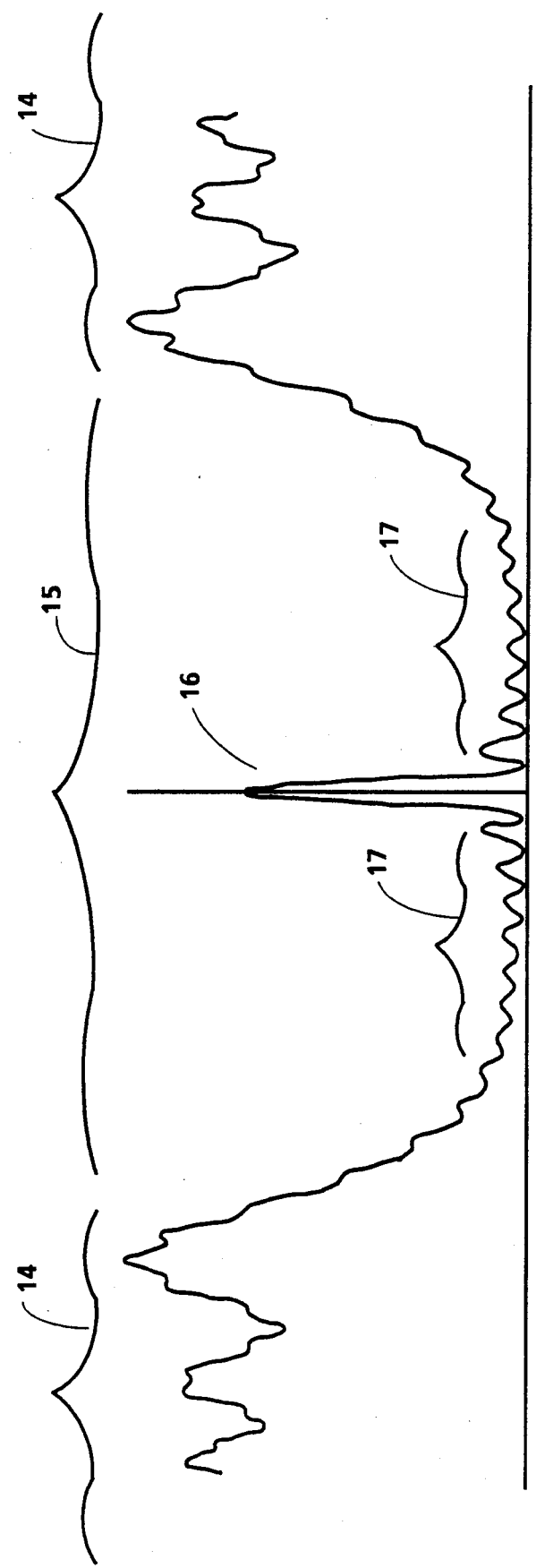
FIG. 2 depicts in schematic form the intensity of the diffracted wave in some arbitrary plane behind the sphere.

FIG. 2 depicts in schematic form the intensity of the diffracted wave in some arbitrary plane behind sphere (12), showing bright region (14), shadow region (15), small high intensity spot (16) and lower intensity diffraction rings (17).

Figure 3:
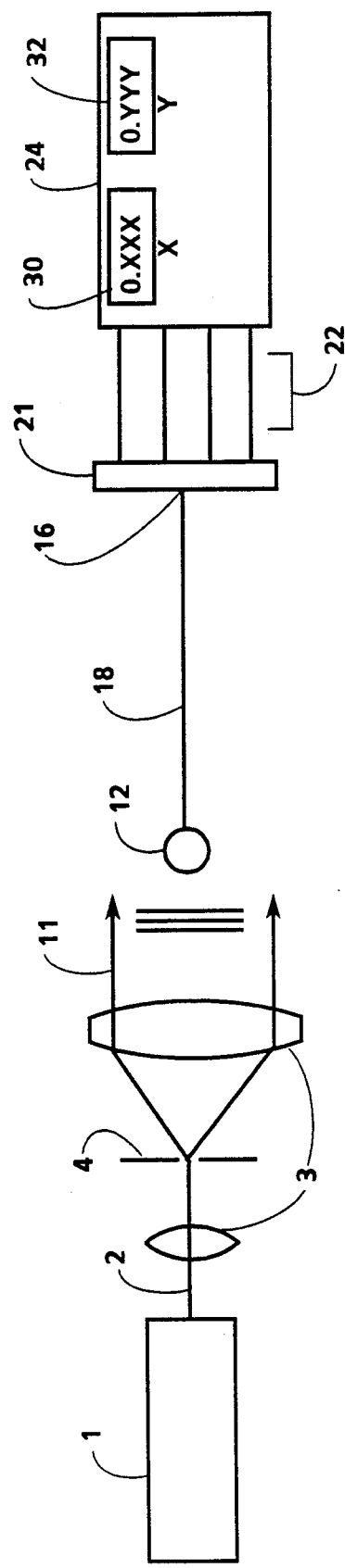
FIG. 3 depicts in schematic form an embodiment of the instant invention for generating a small diameter beam using the direction of propagation of a light wave and one fixed point.

FIG. 3 depicts in schematic form one embodiment of the instant invention for generating a small diameter beam using the direction of propagation of a light wave and one fixed point. This small diameter light beam defines a straight reference line which is useful for alignment and measurement purposes. Light source (1), most preferably a laser, emits beam (2) which is expanded, collimated and spatially filtered by telescope (3) and pinhole (4) to produce beam (11). As previously described in detail, beam (11) is diffracted by sphere (12) to produce beam (18). Beam (18) is a small diameter straight reference line. Beam (18) produces spot (16) on detector (21). Detector (21) has three or more separate active detection areas which spatially sample the intensity of spot (16). The resultant voltages (22) from each active detection are sent to center locating electronics/computer (24) which processes voltages (22) to give the position of detector (21) relative to straight reference line (18). The X and Y positions are displayed on displays (30) and (32) respectively.

Figure 4:
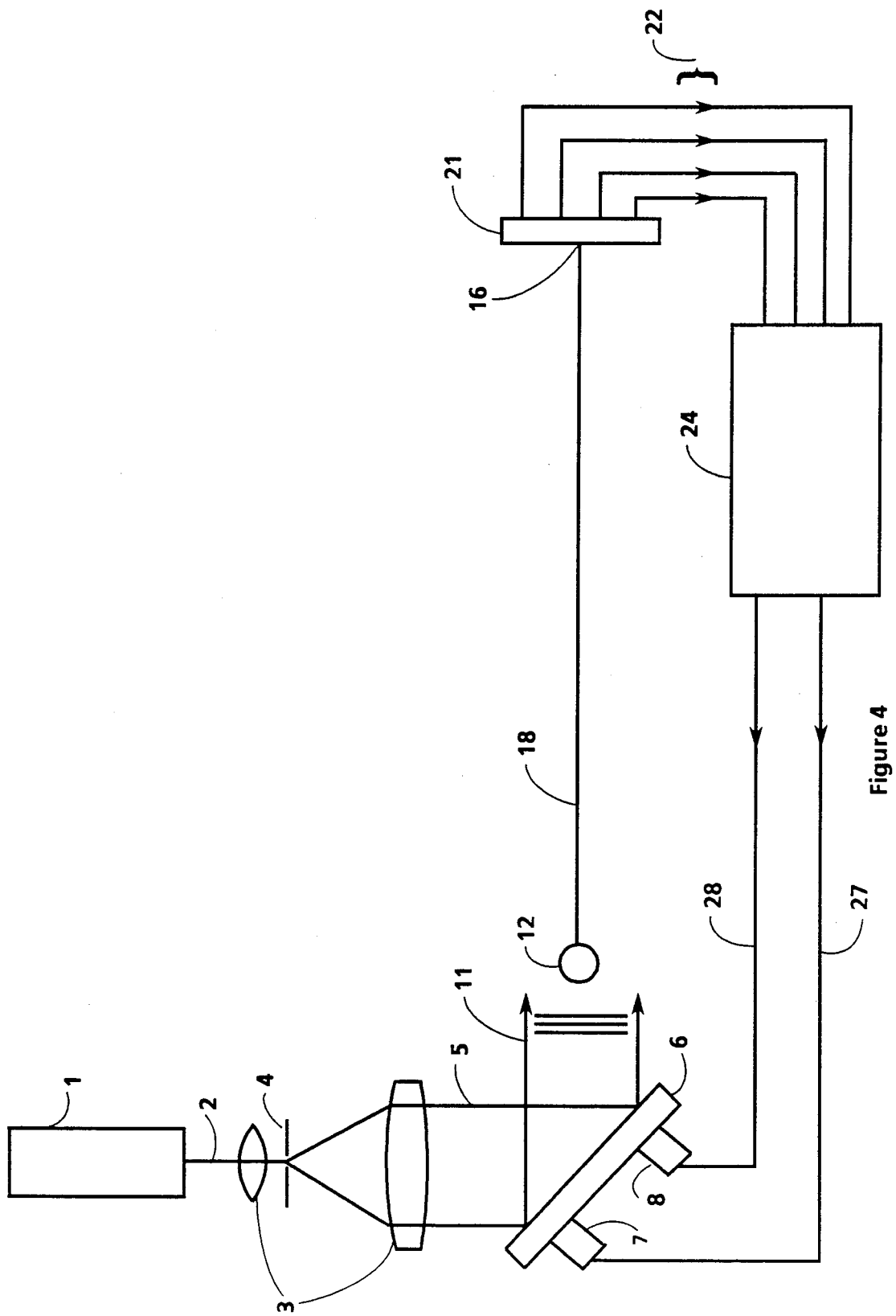
FIG. 4 depicts in schematic form a second embodiment of the instant invention for generating a spatially stable small diameter beam between two fixed points.

FIG. 4 depicts in schematic form an embodiment of the instant invention for generating a spatially stable small diameter beam between two fixed points. This light beam defines a straight reference line which is useful for alignment and measurement purposes. Light source (1), most prefereably a laser, emits beam (2) which is expanded, collimated and spatially filtered by telescope (3) and pinhole (4) to produce beam (5). Beam (5) is reflected from steering mirror (6), which can be tilted about two axes by the application of voltage to piezoelectric tilt adjusters (7) and (8), to give beam (11). As previously described in detail, beam (11) is diffracted by sphere (12) to produce beam (18). Beam (18) is a small diameter straight reference line. Beam (18) produces spot (16) on detector (21). Detector (21) has three or more separate active detection areas which spatially sample the intensity of spot (16). The resultant voltages (22) from each active detection area are sent to center locating electronics/computer (24) which processes voltages (22) to give error signals (27) and (28) which are related to the displacement of spot (16) from the center of detector (21) in the X and Y directions, respectively. Signals (27) and (28) are applied to tilt adjsuters (7) and (8), respectively, to tilt steering mirror (6) and thus change the angle of incident of beam (11) on sphere (12) so that spot (16) is centered on detector (21). In this manner beam (18) becomes a spatially stable, small diameter straight line between two fixed points, namely, the center of sphere (12) and the center of detector (21).

The principal advantages of the instant invention are: (1) the diameter of the straight reference line is smaller, over its entire length, than straight reference lines generated by other optical means, due to the unique way it is generated; and (2) the spatial stability of the straight reference line is higher than other methods because its smaller diameter permits the detector to locate it center with higher resolution, thus providing the means via feedback electronics and a steering mirror to keep the straight reference line stable in space. In the second embodiment of the instant invention, an additional advantage is that it is insensitive to angular instabilities of the incident light beam.

While a preferred embodiment of the invention has been disclosed, obviously modification can be made therein, without departing from the scope of the invention as defined in the folliwng claims.

What is claimed is:

1. A system capable of generating a spatially stable, small diameter light beam for providing a straight reference line over a long distance, said system comprising a source of spatially filtered, collimated light waves, an opaque sphere having a center, said opaque sphere being disposed in the path of said collimated light waves for diffracting said collimated light waves to form said small diameter light beam, said formed small diameter light beam comprising a continuum of high intensity Poisson's spots, said small diameter light beam comprising said straight reference line having an extension which passes through said center and is normal to said collimated light wave incident on said opaque sphere; means disposed in the path of said formed small diameter light beam for spatially sampling said intensity of a said Poisson's spot at a given location along said path of said formed small diameter light beam; and means associated with said sampling means for determining a position of said sampling means relative to said straight reference line at said given location based on said intensity sampling.

2. A system in accordance with claim 1 where said source of a spatially filtered collimated light wave comprises a laser.

3. A system in accordance with claim 2 wherein said laser emits a light beam, said light source further comprising a telescope means and pinhole means for expanding, collimating and spatially filtering said emitted light beam for producing said spatially filtered collimated light waves.

4. A system in accordance with claim 3 wherein said means disposed in the path of said formed small diameter light beam comprises detecting means for spatially sampling said intensity.

5. A system in accordance with claim 4 wherein said detecting means comprises a plurality of separate active detection areas which spatially sample the intensity of said spot at said given location.

6. A system in accordance with claim 5 wherein said plurality of separate active detection areas comprises at least three said active detection areas.

7. A system in accordance with claim 6 wherein said detecting means comprises means for producing a resultant voltage signal based on said intensity sampling.

8. A system in accordance with claim 7 wherein said resultant voltage signal is produced from each active detection by said detecting means.

9. A system in accordance with claim 8 wherein said determining means comprises means for processing said resultant voltage signal for providing a position indication of said sampling means relative to said straight reference line.

10. A system in accordance with claim 9 wherein said sytem further comprises display means associated with said determining means for displaying coordinates for said position indication.

11. A system in accordance with claim 10 wherein said displayed coordinates comprise orthogonal coordinates.

12. A system in accordance with claim 1 wherein said means disposed in the path of said formed small diameter light beam comprises detecting means for spatially sampling said intensity.

13. A system in accordance with claim 12 wherein said detecting means comprises a plurality of separate active detection areas which spatially smple the intensity of said spot at said given location.

14. A system in accordance with claim 13 wherein said plurality of separate active detection areas comprises at least three said active detection areas.

15. A system in accordance with claim 14 wherein said detecting means comprises means for producing a resultant voltage signal based on said intensity sampling.

16. A system in accordance with claim 15 wherein said resultant voltage signal is produced from each said active detection area by said detecting means.

17. A system in accordance with claim 12 wherein said detecting means comprises means for producing a resultant voltage signal based on said intensity sampling.

18. A system in accordance with claim 17 wherein said resultant voltage signal is produced from each said active detection area by said detecting means.

19. A system in accordance with claim 18 wherein said determining means comprises means for processing said resultant voltage signal for providing a position indication of said sampling means realtive to said straight reference line.

20. A system in accordance with claim 1 further comprising beam steering means disposed between said source of spatially filtered collimated light waves and said opaque sphere for controlling the angle of incidence of said collimated light wave incident on said opaque sphere.

21. A system in accordance with claim 20 wherein said beam steering means comprises means for changing said angle of incidence.

22. A system in accordance with claim 21 wherein said means disposed in the path of said formed small diameter light beam comprises detecting means for spatially sampling said intensity.

23. A system in accordance with claim 22 wherein said detecting means comprises means for producing a resultant voltage signal based on said intensity sampling.

24. A system in accordance with claim 23 wherein determining means comprises means for processing said resultant voltage signal for providing a position indication of said sampling means relative to said straight reference line.

25. A system in accordance with claim 24 wherein said detecting means has an associated center, said position indication comprising an error signal related to the displacement of said spatially sampled spot from said detecting means center, said error signal being provided to said means for changing said angle of incidence, said means for changing said angle of incidence changing said angle of incidence in response to said error signal for centering said detected spot on said detecting means center; whereby said small diameter beam comprises a small diameter straight line between two fixed points.

26. A system in accordance with claim 25 wherein said beam steering means comprises a steering mirror for reflecting said collimated light waves.

27. A system in accordance with claim 26 wherein said means for changing said angle of incidence comprises tilt adjusting means associated with said steering mirror for tilting said steering mirror to change said angle of incidence.

28. A system in accordance with claim 27 wherein said tilt adjusting means comprises a pair of piezoelectric tilt adjusters for tilting said steering mirror about two axes.

29. A system in accordance with claim 28 wherein said source of a spatially filtered collimated light waves comprises a laser.

30. A system in accordance with claim 29 wherein said laser emits a light beam, said light source further comprising a telescope means and pinhole means for expanding, collimating and spatially filtering said emitted light beam for producing said spatially filtered collimated light waves.

31. A system in accordance with claim 20 wherein said beam steering means comprises a steering mirror for reflecting said collimated light waves.

32. A system in accordance with claim 31 wherein said beam steering means comprises means for changing said angle of incidence.

33. A system in accordance with claim 32 wherein said means for changing said angle of incidence comprises tilt adjusting means associated with said steering mirror for tilting said steering mirror to change said angle of incidence.

34. A system in accordance with claim 33 wherein said tilt adjusting means comprises a pair piezoelectric tilt adjusters for tilting said steering mirror about two axes.

35. A system in accordance with claim 31 wherein said means for changing said angle of incidence comprises tilt adjusting means associated with said steering mirror for tilting said steering mirror to change said angle of incidence.

36. A system in accordance with claim 35 wherein said tilt adjusting means comprises a pair of piezoelectric tilt adjusters for tilting said steering mirror about two axes.

37. A system in accordance with claim 31 wherein said source of a spatially filtered collimated light waves comprises a laser.

38. A system in accordance with claim 37 wherein said laser emits a light beam, said light source further comprising a telescope means and pinhole means for expanding, collimating and spatially filtering said emitted light beam for producing said spatially filtered collimated light waves.

39. A system in accordance with claim 33 wherein said source of a spatially filtered collimated light waves comprises a laser.

40. A system in accordance with claim 39 wherein said laser emits a light beam, said light source further comprising a telescope means and pinhole means for expanding, collimating and spatially filtering said emitted light beam for producing said spatially filtered collimated light waves.

41. A system in accordance with claim 34 wherein said source of a spatially filtered collimated light waves comprises a laser.

42. A system in accordance with claim 41 wherein said laser emits a light beam, said light source further comprising a telescope means and pinhole means for expanding, collimating and spatially filtering said emitted light beam for producing said spatially filtered collimated light waves.

* * * * *

UNITED STATES PATENT AND TRADEMARK OFFICE
CERTIFICATE OF CORRECTION

PATENT NO. : 4,963,022
DATED : October 16, 1990
INVENTOR(S) : GARY E. SOMMARGREN It is certified that error appears in the above-identified patent and that said Letters Patent is hereby corrected as shown below:

Column 1, line 9: Change "diamter" to --diameter--.

Column 1, line 38: Change "instanct" to --instant--.

Column 1, line 47: Between "of" and "the", delete "of".

Column 2, line 24: Change "sncematic" to --schematic--.

Column 2, line 36-37: Change "Possion's" to --Poisson's--.

Column 3, line 6: Change "prefereably" to --preferably--.

Column 3, line 23: Change "adjsuters" to --adjusters--.

Column 4, line 2: Change "wave" to --waves--.

Column 4, line 33: Change "sytem" to --system--.

Column 4, line 45: Change "smple" to --sample--.

Column 5, line 5: Change "wave" to --waves--.

UNITED STATES PATENT AND TRADEMARK OFFICE
CERTIFICATE OF CORRECTION

PATENT NO. : 4,963,022

DATED : October 16, 1990

INVENTOR(S) : GARY E. SOMMARGREN

It is certified that error appears in the above-identified patent and that said Letters Patent is hereby corrected as shown below:

Column 5, line 20: Before "determining", insert --said--.

Column 6, line 15: Between "pair" and "piezoelectric", insert --of--.

Signed and Sealed this

Thirteenth Day of October, 1992

Attest:

DOUGLAS B. COMER

Attesting Officer     Acting Commissioner of Patents and Trademarks

UNITED STATES PATENT AND TRADEMARK OFFICE
CERTIFICATE OF CORRECTION

PATENT NO. : 4,963,022

DATED : October 16, 1990

INVENTOR(S): GARY E. SOMMARGREN et al.

It is certified that error appears in the above-identified patent and that said Letters Patent is hereby corrected as shown below:

Column 3, line 36:  Change "it" to --its--.

Column 4, line 2:   Between "of" and "spatially", delete "a".

Column 6, line 28:  Between "of" and "spatially", delete "a".

Column 6, line 37:  Between "of" and "spatially", delete "a".

Column 6, line 46:  Between "of" and "spatially", delete "a".

Signed and Sealed this

Twelfth Day of January, 1993

*Attest:*

DOUGLAS B. COMER

*Attesting Officer*

Acting Commissioner of Patents and Trademarks